(12) United States Patent
Okuda et al.

(10) Patent No.: US 10,157,715 B2
(45) Date of Patent: Dec. 18, 2018

(54) SWITCH APPARATUS HAVING WIRELESS FUNCTION

(71) Applicant: KABUSHIKI KAISHA TOKAI RIKA DENKI SEISAKUSHO, Aichi (JP)

(72) Inventors: Ryosuke Okuda, Aichi (JP); Shuichi Iwata, Aichi (JP); Satoshi Ogawa, Aichi (JP)

(73) Assignee: KABUSHIKI KAISHA TOKAI TIKA DENKI SEISAKUSHO, Aichi (JP)

( * ) Notice: Subject to any disclaimer, the term of this patent is extended or adjusted under 35 U.S.C. 154(b) by 155 days.

(21) Appl. No.: 15/123,677

(22) PCT Filed: Mar. 5, 2015

(86) PCT No.: PCT/JP2015/056564
§ 371 (c)(1),
(2) Date: Sep. 5, 2016

(87) PCT Pub. No.: WO2015/137239
PCT Pub. Date: Sep. 17, 2015

(65) Prior Publication Data
US 2017/0018377 A1    Jan. 19, 2017

(30) Foreign Application Priority Data

Mar. 11, 2014   (JP) .................................. 2014-047685
Oct. 29, 2014   (JP) .................................. 2014-220468

(51) Int. Cl.
*H01H 9/16*    (2006.01)
*H01H 13/04*   (2006.01)
(Continued)

(52) U.S. Cl.
CPC .......... *H01H 9/168* (2013.01); *H01H 13/023* (2013.01); *H01H 13/04* (2013.01);
(Continued)

(58) Field of Classification Search
CPC ........ B60R 25/00; B60R 25/04; H01H 9/168; H01H 2300/032; H01H 2231/026; F02N 11/0803; F02N 11/08; F02N 11/0807
(Continued)

(56) References Cited

U.S. PATENT DOCUMENTS

| 8,810,363 | B2 * | 8/2014 | Sakamoto | B60R 25/04 180/279 |
| 9,412,530 | B2 * | 8/2016 | Kirita | F02N 11/0807 |
| 2010/0051425 | A1 | 3/2010 | Imai et al. | |
| 2012/0075063 | A1 | 3/2012 | Sakamoto et al. | |

FOREIGN PATENT DOCUMENTS

| CN | 101665108 A | 3/2010 |
| CN | 102472238 A | 5/2012 |

(Continued)

OTHER PUBLICATIONS

Chinese Office Action dated May 24, 2017 issued in Chinese patent application No. 201580012590.2.
(Continued)

*Primary Examiner* — Vanessa Girardi

(57) ABSTRACT

A switch apparatus has a wireless function and is provided with a body, a knob, which is assembled to the body and can be switch-operated, an antenna coil for communication operations, which is wound on the body, and a connecter terminal. The connecter terminal includes at least one terminal, which is provided to the body by insert molding and is bonded to the antenna coil, and at least one pin.

5 Claims, 6 Drawing Sheets

(51) Int. Cl.
*H01H 13/52* (2006.01)
*H01Q 1/32* (2006.01)
*H01Q 7/00* (2006.01)
*H01H 13/02* (2006.01)
*H01H 13/50* (2006.01)
*B60R 25/24* (2013.01)

(52) U.S. Cl.
CPC ............ *H01H 13/50* (2013.01); *H01H 13/52* (2013.01); *H01Q 1/3241* (2013.01); *H01Q 7/00* (2013.01); *B60R 25/24* (2013.01); *H01H 2231/026* (2013.01); *H01H 2300/032* (2013.01)

(58) Field of Classification Search
USPC ................ 200/323; 340/5.62, 426.3, 426.36; 307/10.3
See application file for complete search history.

(56) References Cited

FOREIGN PATENT DOCUMENTS

| | | |
|---|---|---|
| JP | 2005057131 A | 3/2005 |
| JP | 2011-60626 A | 3/2011 |
| JP | 2011124030 A | 6/2011 |
| JP | 2011169180 A | 9/2011 |
| JP | 2012-116422 A | 6/2012 |
| JP | 2014-167260 A | 9/2014 |
| WO | 2011102284 A1 | 8/2011 |

OTHER PUBLICATIONS

Chinese Office Action dated Feb. 9, 2018 issued in Chinese Patent application No. 201580012590.2.
Extended European Search Report dated Oct. 2, 2017 issued in European Patent application No. 15761921.4.

* cited by examiner

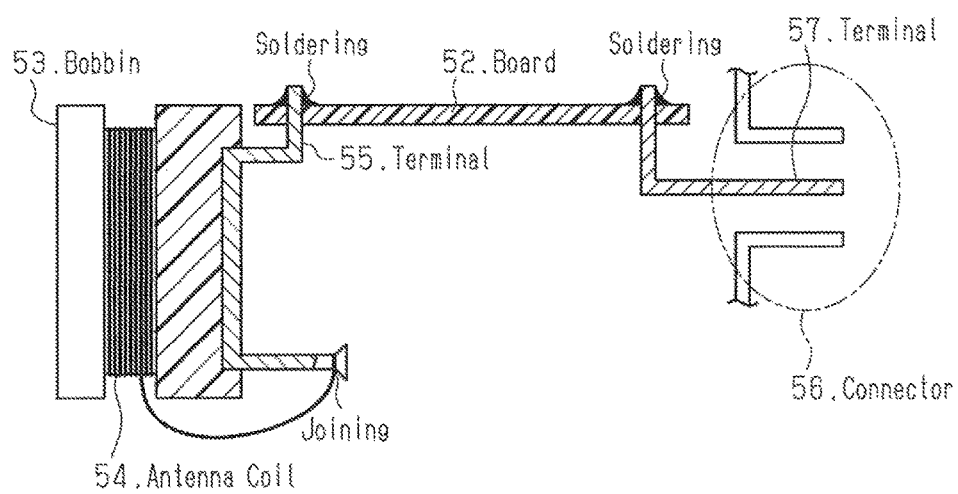

SWITCH APPARATUS HAVING WIRELESS FUNCTION

TECHNICAL FIELD

The present invention relates to a switch apparatus that has a wireless function and is capable of performing a communication operation with an antenna coil and a switch operation with a knob.

BACKGROUND ART

Patent document 1 discloses a switch apparatus used in an engine starting system for a vehicle. The user of the vehicle, to which the above system is applied, carries an electronic key (referred to as portable device) instead of a conventional mechanical key. When the electronic key is verified and an affirmative determination is made that the electronic key is the key for the vehicle, the vehicle enables vehicle control such as starting of the engine. More specifically, the portable device incorporates a battery and transmits identification information (ID) that is unique to the portable device in response to a request signal from the vehicle. The vehicle determines whether or not the ID obtained from the portable device conforms to a reference ID. Under the condition that the ID obtained from the portable device conforms to the reference ID, the vehicle enables vehicle control. Thus, when the user operates a knob of the switch apparatus located near the driver seat while carrying the portable device, the engine can be started.

However, when the voltage of the battery incorporated in the portable device is low, the portable device cannot transmit the ID in response to the request signal. Thus, in this case, even when the user operates the knob of the switch apparatus while carrying the portable device, the engine cannot be started. In the above system, the switch apparatus generally includes an antenna coil to cope with a situation such as battery depletion. Operation of the knob of the switch apparatus triggers transmission of a drive radio wave from the antenna coil. When entering a transmission area of the drive radio wave, the portable device generates power from the drive radio wave and transmits the ID with the generated power. Thus, when the user operates the knob of the switch apparatus while holding the portable device near the switch apparatus, the engine can be started. The switch apparatus that is capable of performing a communication operation with the antenna coil and a switch operation with the knob as described above is referred to as a switch apparatus having a wireless function.

Referring to FIG. 8, a switch apparatus 51 having a wireless function includes a case (not shown). The case accommodates a board 52 on which necessary components are mounted. The mounted components of the board 52 include an antenna unit. The antenna unit includes a bobbin 53, an antenna coil 54, which is wound around the bobbin 53, and a terminal 55, which is located on the bobbin 53. The terminal 55 includes a first end portion and a second end portion, which project from the bobbin 53. One end of the antenna coil 54 is wound around the distal end of the first end portion of the terminal 55. The antenna coil 54 and the terminal 55 are joined together through swaging or the like. The distal end of the second end portion of the terminal 55 is inserted into a hole of the board 52. The part of the second end portion of the terminal 55 passed through the hole is soldered to an upper surface of the board 52.

Additionally, a terminal 57 of a connector 56, which is one of the mounted components, is soldered to the board 52 at a location separated from where the terminal 55 is soldered. The terminal 57 of the connector 56 is electrically connected to the terminal 55 of the antenna coil 54 by a conductive pattern of the board 52. In addition to the terminal 57, the connector 56 includes a terminal that functions as a medium for outputting a switch signal corresponding to the operation of a knob (not shown) or the like to an external apparatus. This enables the switch apparatus 51 having a wireless function to exchange electric signals with the external apparatus. The communication operation and the switch operation are reflected on the vehicle control.

PATENT DOCUMENT

Patent Document 1: Japanese Laid-Open Patent Publication No. 2011-60626

SUMMARY OF THE INVENTION

As described above, the terminal 55 of the antenna coil 54 is soldered to the board 52. Also, the terminal 55 of the antenna coil 54 is electrically connected to the terminal 57 of the connector 56 by the board 52. In this case, a process for soldering the terminal 55 is necessary. Also, the board 52 needs to have space for soldering the terminal 55. This increases the cost and size of the switch apparatus 51 having a wireless function.

Accordingly, it is an object of the present invention to provide an inexpensive switch apparatus having a wireless function that may be reduced in size.

One aspect of the present invention is a switch apparatus having a wireless function. The switch apparatus includes a body, a knob coupled to the body and capable of performing a switch operation, an antenna coil wound around the body and used for a communication operation, and a connector terminal. The connector terminal includes at least one terminal that is insert-molded to the body and joined with the antenna coil and at least one pin.

Preferably, the above structure further includes a cover that is arranged to surround the connector terminal and serves as a connector housing.

Preferably, the above structure further includes a holding portion that holds the at least one pin. The cover includes a positioning portion that positions the holding portion and the body.

Another aspect of the present invention is a switch apparatus having a wireless function. The switch apparatus includes a body, a knob coupled to the body and capable of performing a switch operation, an antenna coil wound around the body and used for a communication operation, and a connector. The connector includes at least one terminal that is insert-molded to the body and joined with the antenna coil and a housing that surrounds the at least one terminal.

Preferably, in the above structure, the connector includes a connector terminal that includes the at least one terminal and at least one pin. The switch apparatus having a wireless function further includes a holding portion that holds the at least one pin. The body includes a positioning portion that positions the holding portion in the housing.

Preferably, in the above structure, the knob includes an operation surface operable by a user. The body includes a body housing that accommodates the knob so that the operation surface of the knob is exposed from the body, a circumferential surface of the body located at a position corresponding to a circumferential surface of the knob, and a wound portion defined by the circumferential surface of the body. The antenna coil is wound around the wound portion.

Preferably, in the above structure, the at least one terminal includes a first end portion that projects from the body and is joined with the antenna coil and a second end portion that projects from the body and is located more proximate to the at least one pin than the first end portion. The switch apparatus having a wireless function further includes a connector housing that surrounds the second end portion of the at least one terminal and the at least one pin.

Preferably, in the above structure, the body includes an outer surface located at a side opposite to the body housing. The second end portion of the at least one terminal and the at least one pin project from the outer surface of the body.

Preferably, in the above structure, the connector housing is formed integrally with the body.

Preferably, in the above structure, the connector housing includes a cover that is coupled to the body and accommodates the first end portion and the second end portion of the at least one terminal and the at least one pin.

Preferably, in the above structure, the body includes a positioning hole that extends through the outer surface and an inner surface opposed to the outer surface. The switch apparatus having a wireless function further includes a holding portion that is fitted into the positioning hole of the body. The holding portion holds the at least one pin.

The present invention reduces cost and size.

BRIEF DESCRIPTION OF THE DRAWINGS

FIG. 8 is a cross-sectional view showing the structure of a prior-art switch apparatus having a wireless function.

DESCRIPTION OF THE EMBODIMENTS

First Embodiment

A first embodiment of a switch apparatus having a wireless function will now be described.

Figure 1:
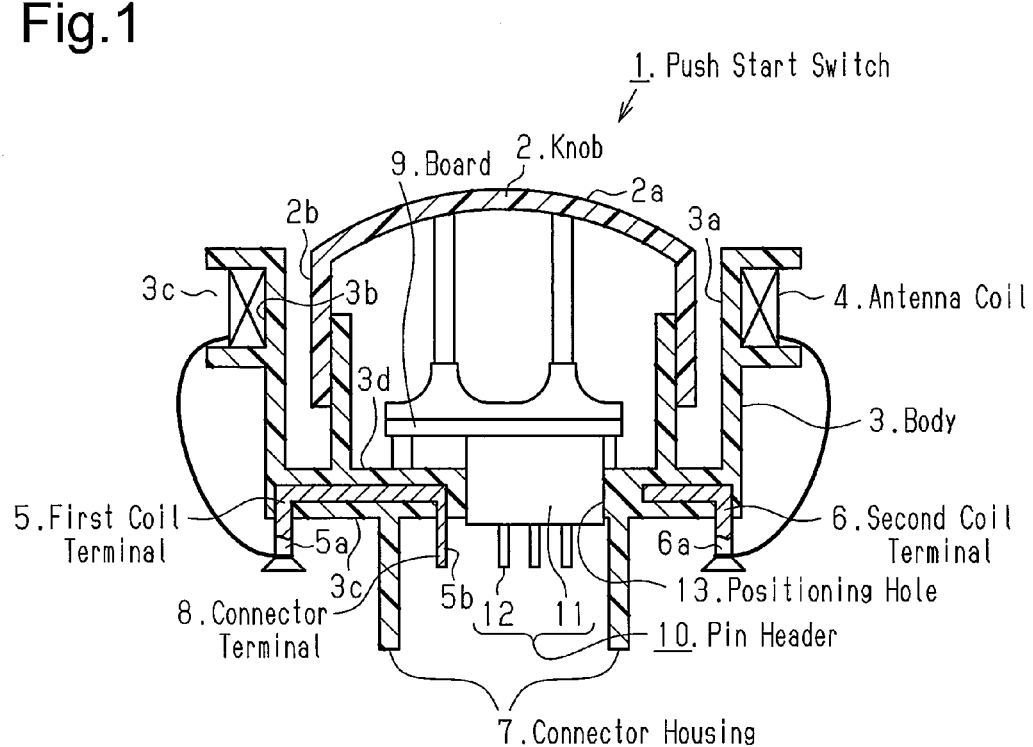
FIG. 1 is a cross-sectional view showing the structure of a first embodiment of a push start switch.

FIG. 1 shows a push start switch 1, which is one example of a switch apparatus having a wireless function, located near a driver seat. The push start switch 1 includes a body 3 and a knob 2, which is coupled to and exposed from the body 3 and operable by the user. The push start switch 1 is mounted on a vehicle to which an engine starting system is applied. The user carries a portable device that serves as a vehicle key.

An antenna coil 4 is wound around the body 3, which extends around the knob 2. Additionally, a first coil terminal 5 and a second coil terminal 6 are insert-molded to the body 3. The body 3 includes a frame-shaped connector housing 7 located between the first coil terminal 5 and the second coil terminal 6.

The first coil terminal 5 includes a first end portion projecting from the body 3 outside the frame (left side on the plane of the drawing) of the connector housing 7. The antenna coil 4 includes a first end portion that is wound around the projected portion near the distal end. The antenna coil 4 and the first coil terminal 5 are joined together through swaging or the like. The first coil terminal 5 includes a second end portion projecting from the body 3 inside the frame of the connector housing 7. The projected portion includes a distal end defining a connector terminal 8.

The second coil terminal 6 includes a first end portion projecting from the body 3 outside the frame (right side on the plane of the drawing) of the connector housing 7 at a side opposite to the first end portion of the first coil terminal 5. The antenna coil 4 includes a second end portion that is wound around the projected portion near the distal end. The antenna coil 4 and the coil terminal 5 are joined together through swaging or the like. The second coil terminal 6 includes a second end portion projecting from the body 3 inside the frame of the connector housing 7. The projected portion includes a distal end defining a connector terminal (not shown) located behind the plane of the drawing.

A board 9, on which necessary components are mounted, is coupled to the body 3. The mounted components include a fixed contact, which contacts a movable contact when the knob 2 is operated, a light emitting diode, which is illuminated when the knob is operated, and a pin header 10, which serves as a connection medium that allows the push start switch 1 to exchange electric signals with an external apparatus. The pin header 10 includes a case 11, which functions as a body, and pins 12, which project from the case 11 in an array.

The body 3 includes a positioning hole 13, which is located inside the frame of the connector housing 7 and slightly smaller than the frame of the connector housing 7. The positioning hole 13 positions the pin header 10. More specifically, the board 9 on which the pin header 10 and the like are mounted is coupled to the body 3, and the pin header 10 is fitted into the positioning hole 13. At this time, the wall of the body 3 defining the positioning hole 13 contacts the case 11. Consequently, a distal portion of each pin 12 projected from the case 11 functions as a connector terminal.

This results in the formation of a connector in which the connector terminals (including connector terminal 8 and pins 12) are arranged in an array inside the frame of the connector housing 7. When the connector is connected to an associated connector of the external apparatus, the communication operation of the antenna coil 4 and the switch operation of the knob 2 are reflected on the vehicle control.

In summary, the above description has broad concepts as described below.

Concept 1. A push start switch 1 including:
a body 3;
a knob 2 coupled to the body 3 and capable of performing a switch operation;
an antenna coil 4 wound around the body 3 and used for a communication operation; and
a connector terminal 8, wherein
the connector terminal 8 is insert-molded to the body 3, and
the connector terminal 8 includes at least one of terminals 5, 6, joined with the antenna coil 4, and at least one pin 12.

Concept 2. The push start switch 1 according to concept 1, wherein the knob 2 includes an operation surface 2a operable by a user, the body 3 preferably includes a body housing 3a that accommodates the knob 2 so that the operation surface 2a of the knob 2 is exposed from the body 3, a circumferential surface 3b of the body 3 located at a position corresponding to a circumferential surface 2b of the knob 2, and a wound portion 3c around which an antenna coil 4 is wound and located on the circumferential surface 3b of the body 3.

Concept 3. The push start switch 1 according to concept 1, wherein the at least one of terminals 5, 6 respectively includes first end portions 5a, 6a projecting from the body 3 and joined with the antenna coil 4 and second end portions 5b, 6b located more proximate to the at least one pin 12 than the first end portions 5a, 6a and projecting from the body 3, the push start switch 1 preferably further includes a connector housing 7 that surrounds the second end portions 5b, 6b of the at least one of terminals 5, 6 and the at least one pin 12.

Concept 4. The push start switch 1 according to concept 1, wherein the body 3 includes an outer surface 3c located at a side opposite to the body housing 3a, and the second end portions 5b, 6b of the at least one of terminals 5, 6 and the at least one pin 12 preferably project from the outer surface 3c of the body 3.

Concept 5. The push start switch 1 according to concept 1, wherein the body 3 includes an outer surface 3c and a positioning hole 13 that extends through the outer surface 3c and an inner surface 3d opposed to the outer surface 3c, and the push start switch 1 preferably includes a holding portion 11 that is fitted into the positioning hole 13 of the body 3 and holds the at least one pin 12.

The operation of the push start switch 1 will now be described.

The body 3, around which the antenna coil 4 is wound, includes the connector housing 7. The first coil terminal 5 and the second coil terminal 6, which are insert-molded to the body 3, function as the connector terminal 8 or the like. Thus, the connector terminal 8 or the like and the connector housing 7, which are connector elements, are both defined by a single component (body 3). This easily satisfies the dimension accuracy required for the connector.

The pin header 10, which is a component separate from the body 3, is positioned by the body 3. Thus, even when the pin header 10 serves as a connector element, the connector alignment may be easily performed.

As described above, the first embodiment has the advantages described below.

(1) The first coil terminal 5 and the second coil terminal 6, which are insert-molded to the body 3, function as the connector terminals 8. The connector is formed by the connector terminals 8 and the connector housing 7, which is defined by the body 3. Thus, when forming the connector, soldering is not performed. Due to the elimination of soldering, an inexpensive and compact switch apparatus having a wireless function is provided.

(2) The connector terminals include the pins 12 of the pin header 10, the first coil terminal 5, and the second coil terminal 6. The body 3 is provided with the positioning hole 13, which positions the pin header 10 in the connector housing 7. In this structure, connector alignment is performed by selecting a pin header 10 that conforms to the connector specifications (e.g., pin layout) and positioning the pin header 10.

The first embodiment may be modified as follows.

The present technique is not limited to a switch apparatus having a wireless function such as the push start switch 1 and may be applied to any switch apparatus capable of performing a switch operation with the knob 2. The present technique may be applied to a switch apparatus in which a terminal (e.g., first coil terminal 5) is insert-molded to the body 3, to which the knob 2 is coupled, and a connector is formed including the terminal and the connector housing 7, which is defined by the body 3 around the terminal. In this case, the terminal may be joined with a switch component instead of the antenna coil 4.

In this structure, the terminal that is insert-molded to the body 3 functions as a connector terminal and forms the connector together with connector housing 7, which is defined by the body 3. In this case, soldering is not performed. Due to the elimination of soldering, an inexpensive small switch apparatus is provided.

In the above switch apparatus, it is desirable that the body 3 include a positioning means (e.g., positioning hole 13) that positions a separate component (e.g., pin header 10) including a pin, which forms connector terminals together with the terminal, in the connector housing 7.

In this structure, the connector alignment is satisfied by selecting a separate component that conforms to the specifications of the connector and positioning the separate component.

Alternatively, the present technique may be applied to any antenna apparatus capable of performing a communication operation with the antenna coil 4. More specifically, in the antenna apparatus, the antenna coil 4 is wound around the body 3, and a terminal (e.g., first coil terminal 5) to which the antenna coil 4 is joined is insert-molded to the body 3. Additionally, a connector is formed including the terminal and the connector housing 7, which is defined by the body 3 around the terminal. The present technique may be applied to the antenna apparatus. In this case, the knob 2 is selectively coupled to the body 3 depending on whether or not the switch operation is performed.

In this structure, the terminal that is insert-molded to the body 3 functions as a connector terminal and forms a connector together with the connector housing 7, which is defined by the body 3. In this case, soldering is not performed. Due to the elimination of soldering, an inexpensive small antenna apparatus is provided.

In the above antenna apparatus, it is desirable that the body 3 include a positioning means (e.g., positioning hole 13) that positions a separate component (e.g., pin header 10) including a pin, which forms connector terminals together with the terminal, in the connector housing 7.

In this structure, the connector alignment is satisfied by selecting a separate component that conforms to the specifications of the connector and positioning the separate component.

Alternatively, the present technique may be applied to any connector apparatus capable of connecting to an external apparatus. More specifically, in the connector apparatus capable of connecting to an external apparatus, a terminal (e.g., first coil terminal 5) is insert-molded to the body 3, and a connector is formed including the terminal and the connector housing 7, which is defined by the body 3 around the terminal. Additionally, the body 3 includes a positioning means (e.g., positioning hole 13) that positions a separate component (e.g., pin header 10) including a pin, which forms connector terminals together with the terminal, in the connector housing 7. The present technique may be applied to the connector apparatus. The present technique may be applied to the connector apparatus. In this case, the antenna coil 4 is selectively wound around the body 3 depending on whether or not the communication operation is performed. Also, the knob 2 is selectively coupled to the body 3 depending on whether or not the switch operation is performed.

In this structure, the connector alignment is satisfied by selecting a separate component that conforms to the specifications of the connector and positioning the separate component.

Second Embodiment

A second embodiment of a switch apparatus having a wireless function will now be described.

Figure 2:
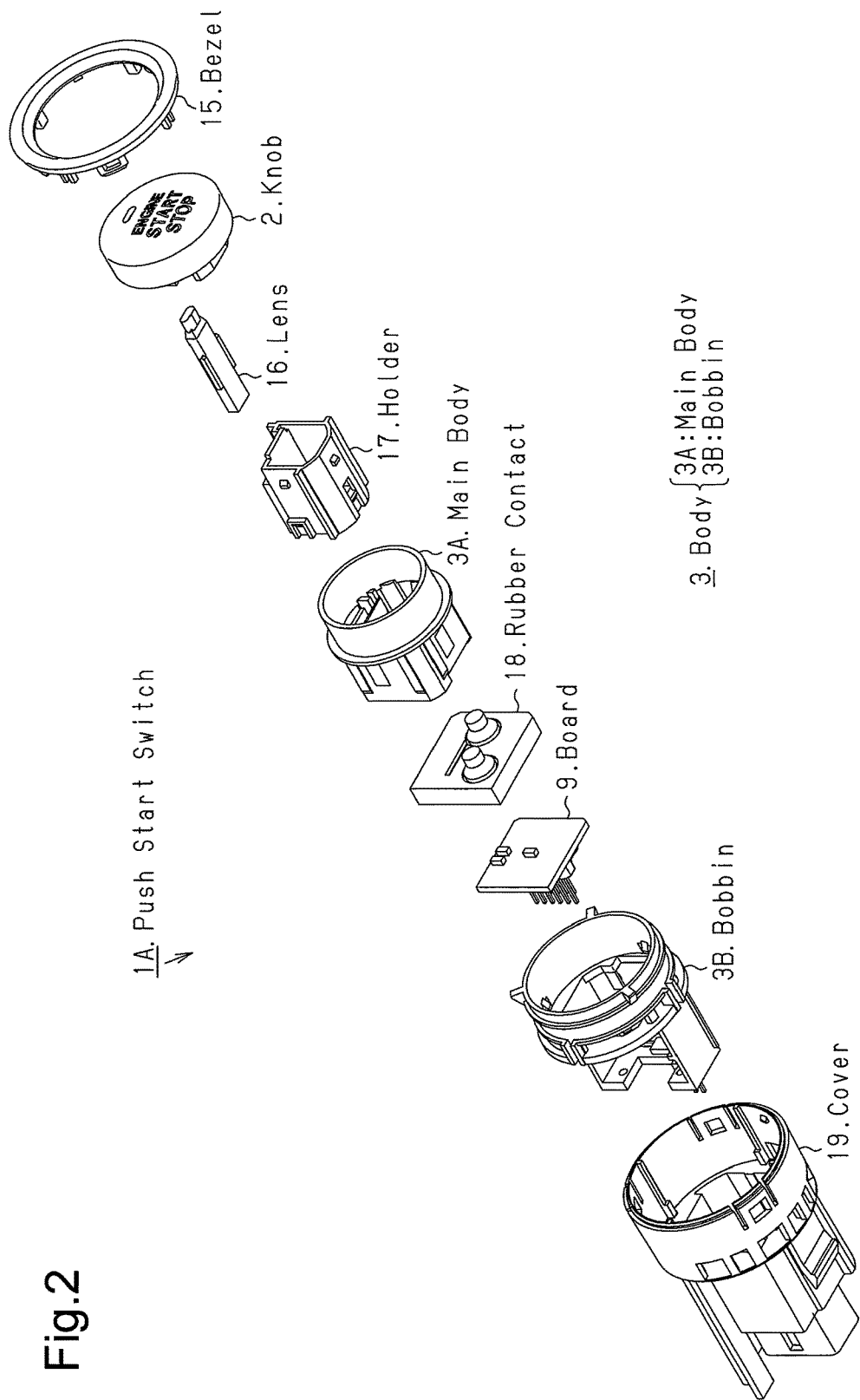
FIG. 2 is an exploded perspective view showing the structure of a second embodiment of a push start switch.

As shown in FIG. 2, the second embodiment of a push start switch 1A includes a body 3 that includes a main body 3A and a bobbin 3B. A knob 2 is coupled to the body 3. An antenna coil (not shown), which is the same as the antenna coil 4 of the first embodiment, is wound around the bobbin 3B. A bezel 15, which is an ornament, is arranged around the knob 2. A lens 16 formed by a light transmitting member is coupled to the knob 2 to guide the light of a light emitting diode located on a board 9. The lens 16 is supported by a holder 17. A rubber contact 18 arranged in the body 3 serves as a movable contact when a switch operation is performed on the knob 2.

In general, when coupling components, the board 9 and the rubber contact 18 are both temporarily set in the bobbin 3B through a side opening of the bobbin 3B. When the holder 17, the lens 16, and the knob 2 are attached to the main body 3A, the main body 3A is coupled to the bobbin 3B through an upper opening of the bobbin 3B. The lower side of the bobbin 3B is covered by a cover 19, which is separate from the body 3. During this process, the bobbin 3B is positioned together with the board 9 and the rubber contact 18, which have been temporarily set. Finally, the bezel 15 is coupled to the cover 19.

Figure 3:
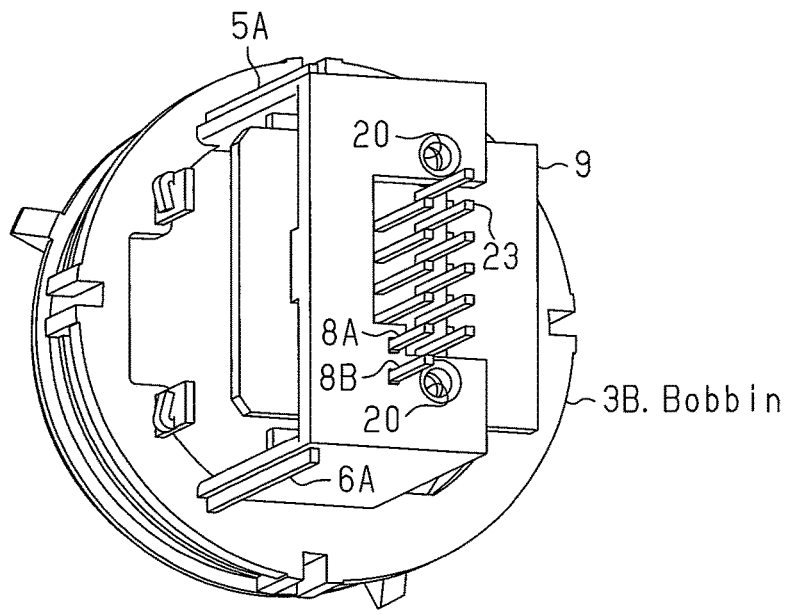
FIG. 3 is a perspective view of a bobbin taken from a lower side of the second embodiment of the push start switch.

As shown in FIG. 3, a first coil terminal 5A and a second coil terminal 6A, which are the same as the first coil terminal 5 and the second coil terminal 6 of the first embodiment, are insert-molded to the bobbin 3B. In the same manner as the first embodiment, the first end portion of the first coil terminal 5A is joined with the first end portion of the antenna coil. The second end portion of the first coil terminal 5A defines a connector terminal 8A. In the same manner, the first end portion of the second coil terminal 6A is joined with the second end portion of the antenna coil. The second end portion of the second coil terminal 6A defines a connector terminal 8B. The bobbin 3B includes a bottom portion provided with two positioning holes 20.

Figure 4:
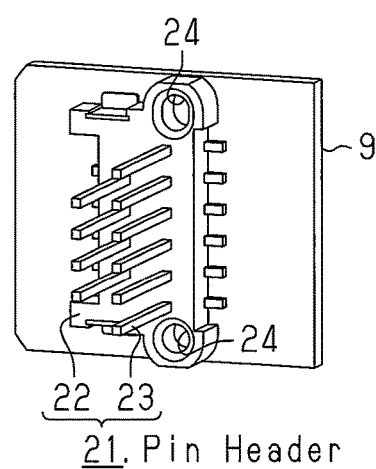
FIG. 4 is a perspective view of a board taken from a lower side of the second embodiment of the push start switch.

Also, referring to FIG. 4, the board 9 includes a lower surface on which a pin header 21 is mounted. The pin header 21 includes a body 22, which functions as a main body, and pins 23, which are arranged in an array and project from the body 22. Each pin 23 includes a basal portion fixed (electrically connected) to the board 9. Each pin 23 includes a distal portion functioning as a connector terminal. The connector terminals (connector terminal 8A, connector terminal 8B, and pins 23) have the same height (same projection amount from board 9). The body 22 of the pin header 21 is provided with two positioning holes 24 corresponding to the positioning holes 20 in the bobbin 3B.

Figure 5:
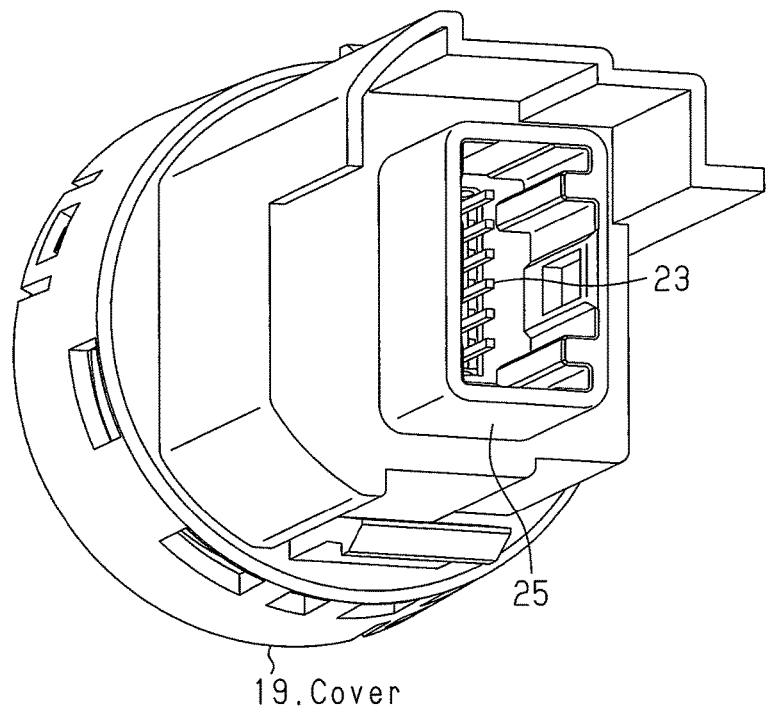
FIG. 5 is a perspective view of a cover taken from a lower side of the second embodiment of the push start switch.

As shown in FIG. 5, the cover 19 includes a frame-shaped connector housing 25 extending around the connector terminals (e.g., pins 23). In the connector, the connector terminals (connector terminal 8A, connector terminal 8B, and pins 23) are arranged in an array inside the frame of the connector housing 25. In the same manner as the first embodiment, when the connector is connected to an associated connector of an external apparatus, the communication operation of the antenna coil and the switch operation of the knob 2 are reflected on the vehicle control.

Figure 6:
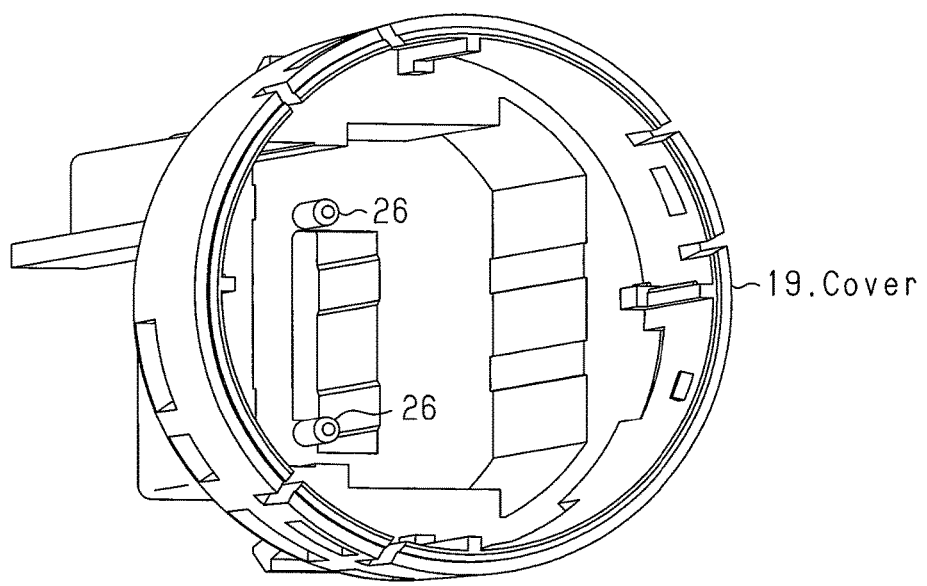
FIG. 6 is a perspective view of the cover taken from an upper side of the second embodiment of the push start switch.

As shown in FIG. 6, the cover 19 includes an inner bottom surface that includes two positioning projections 26 corresponding to the positioning holes 20 in the bobbin 3B and the positioning holes 24 in the pin header 21.

Figure 7:
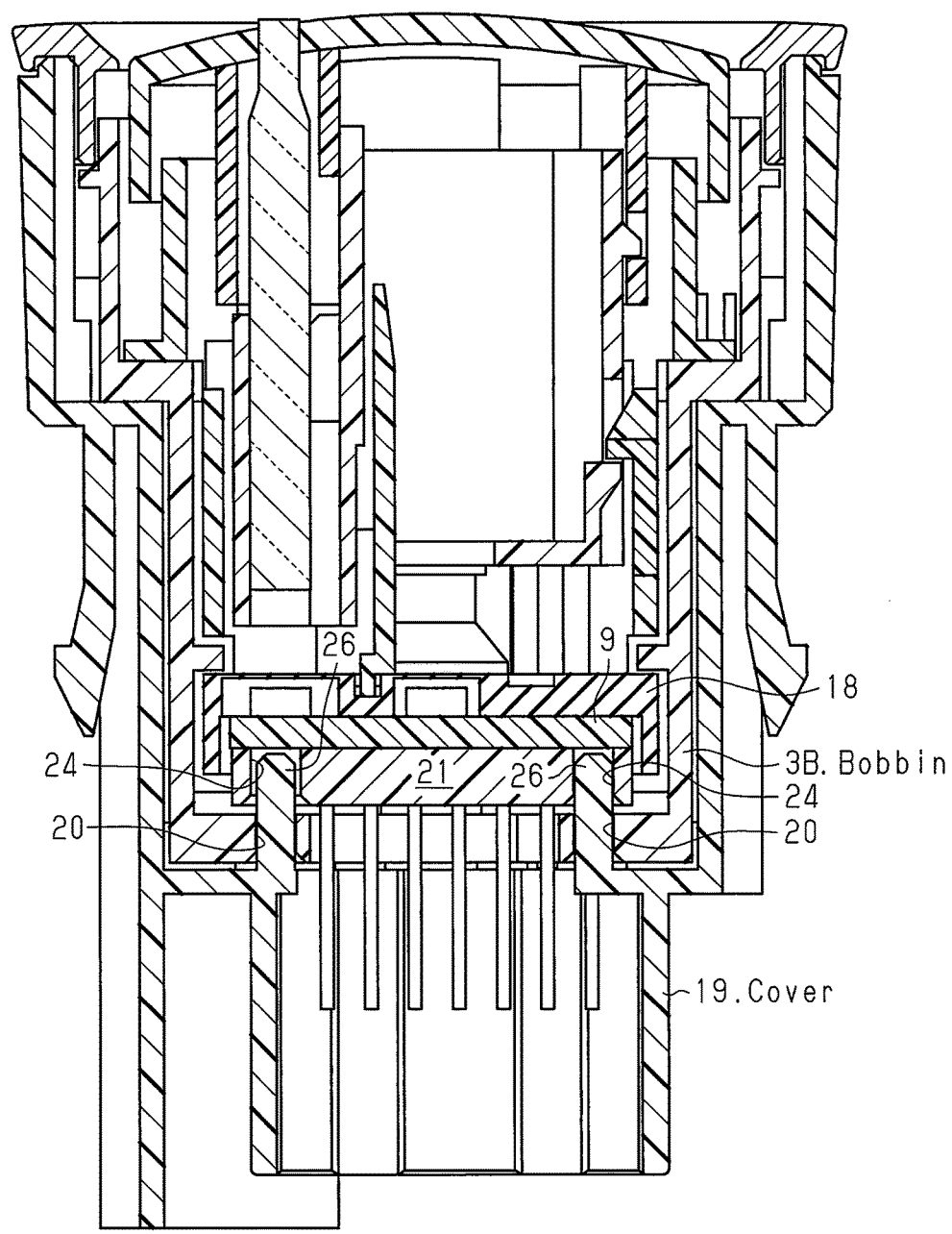
FIG. 7 is a cross-sectional view showing a main portion of a push start switch of the second embodiment of the push start switch.

As shown in FIG. 7, when covering the lower side of the bobbin 3B with the cover 19, the two positioning projections 26 of the cover 19 are inserted into the positioning holes 20 of the bobbin 3B and the positioning holes 24 of the pin header 21, which is mounted on the board 9 that has been temporarily set. This positions the bobbin 3B together with the board 9 and the rubber contact 18, which have been temporarily set.

As described above, the second embodiment has the advantages described below.

(3) The first coil terminal 5A and the second coil terminal 6A, which are insert-molded to the bobbin 3B, form the connector terminals together with the pins 23 of the pin header 21. In this case, soldering is not performed. Due to the elimination of soldering, the inexpensive small push start switch 1A is provided.

(4) The first coil terminal 5A and the second coil terminal 6A, which are insert-molded to the bobbin 3B, form the connector terminals together with the pins 23 of the pin header 21. Additionally, the connector is formed together with the connector housing 25, which is defined by the cover 19 that is separate from the body 3. In this case, soldering is not performed. The elimination of soldering allows the push start switch 1A to be inexpensive and compact.

(5) The cover 19 includes the positioning projections 26 that position the pin header 21, which includes the pins 23 forming the connector terminals, together with the bobbin 3B. In this structure, the connector alignment is performed by selecting a pin header 21 that conforms to the specifications (e.g., pin layout) of the connector and positioning the pin header 21.

(6) The board 9 is coupled from the side opening of the bobbin 3B. This allows for the coupling of the board 9 even when the board 9 has a larger area and cannot be coupled from the upper opening of the bobbin 3B. Thus, the coupling of the board 9 from the side allows for enlargement of the area of the board 9.

The second embodiment may be modified as follows.

In the same manner as the modified examples of the first embodiment, the present technique may be applied to a general switch apparatus, a general antenna apparatus, and a general connector apparatus.

The above description is intended to be illustrative, and not restrictive. For example, the above-described examples (or one or more aspects thereof) may be used in combination with each other. In the above detailed description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A switch apparatus having a wireless function, comprising
a body that includes a positioning portion;
a knob coupled to the body;
an antenna coil wound around the body;
a connector housing extending from the body adjacent the positioning portion; within the connector housing are at least one pin extending from a separate component, and at least one terminal that is insert-molded to the body and joined with the antenna coil such that ends of the at least one pin and terminal terminate proximal to each other which serve to connect the switch apparatus to an external device, the positioning portion positions the at least one pin and terminal in the connector housing.

2. The switch apparatus having a wireless function according to claim 1, further comprising a holding portion that holds the at least one pin.

3. The switch apparatus having a wireless function according to claim 1, wherein the knob includes an operation surface operable by a user, and the body includes a body housing that accommodates the knob so that the operation surface of the knob is exposed from the body, a circumferential surface of the body located at a position corresponding to a circumferential surface of the knob, and a wound portion defined by the circumferential surface of the body, wherein the antenna coil is wound around the wound portion.

4. The switch apparatus having a wireless function according to claim 3, wherein the connector housing is formed integrally with the body.

5. The switch apparatus having a wireless function according to claim 3, wherein the connector housing includes a cover that is coupled to the body and accommodates a first end portion and a second end portion of the at least one terminal and the at least one pin.

* * * * *